(12) United States Patent
Florissi et al.

(10) Patent No.: US 9,489,233 B1
(45) Date of Patent: Nov. 8, 2016

(54) PARALLEL MODELING AND EXECUTION FRAMEWORK FOR DISTRIBUTED COMPUTATION AND FILE SYSTEM ACCESS

(75) Inventors: Patricia G. S. Florissi, Briarcliff Manor, NY (US); Sudhir Vijendra, Cambridge, MA (US)

(73) Assignee: EMC IP Holding Company, LLC, Hopkinton, MA (US)

(*) Notice: Subject to any disclaimer, the term of this patent is extended or adjusted under 35 U.S.C. 154(b) by 584 days.

(21) Appl. No.: 13/535,731

(22) Filed: Jun. 28, 2012

Related U.S. Application Data

(63) Continuation-in-part of application No. 13/435,009, filed on Mar. 30, 2012.

(51) Int. Cl.
*G06F 17/50* (2006.01)
*G06F 9/46* (2006.01)
*G06F 9/50* (2006.01)

(52) U.S. Cl.
CPC .............. *G06F 9/466* (2013.01); *G06F 9/5072* (2013.01)

(58) Field of Classification Search
CPC ........... G06F 11/3466; G06F 11/2257; G06F 11/2273; G06F 2201/86; G06F 17/30327; G06F 17/30592; G06F 8/38; G06F 8/45; G06F 9/5072; G06F 11/008
USPC .............. 703/13, 22; 707/600, 791, 792, 794
See application file for complete search history.

(56) References Cited

U.S. PATENT DOCUMENTS

| | | | |
|---|---|---|---|
| 6,748,447 B1* | 6/2004 | Basani et al. ................. | 709/244 |
| 6,970,924 B1* | 11/2005 | Chu .................... | H04L 41/5067 709/224 |
| 7,756,919 B1* | 7/2010 | Dean et al. .................... | 709/201 |
| 8,364,723 B1* | 1/2013 | Hseush et al. ................ | 707/803 |
| 2002/0194015 A1* | 12/2002 | Gordon .................. | G06Q 10/10 705/1.1 |
| 2002/0194242 A1* | 12/2002 | Chandrasekaran ..... | G06F 9/466 718/101 |
| 2009/0276771 A1* | 11/2009 | Nickolov et al. ............. | 717/177 |
| 2010/0309812 A1* | 12/2010 | Galan Marquez et al. .. | 370/254 |
| 2010/0332531 A1* | 12/2010 | Galande ........................ | 707/770 |
| 2011/0016379 A1* | 1/2011 | McColl et al. ................ | 715/219 |
| 2011/0041006 A1* | 2/2011 | Fowler ............................ | 714/10 |
| 2011/0307521 A1* | 12/2011 | Slezak et al. ................. | 707/800 |
| 2012/0030356 A1* | 2/2012 | Fletcher ........................ | 709/226 |
| 2012/0311589 A1* | 12/2012 | Agarwal et al. .............. | 718/102 |
| 2012/0317155 A1* | 12/2012 | Ogasawara et al. .......... | 707/812 |
| 2012/0317579 A1* | 12/2012 | Liu ................ | 718/104 |
| 2013/0007091 A1* | 1/2013 | Rao et al. ...................... | 709/201 |
| 2013/0047161 A1* | 2/2013 | Simitsis et al. ............... | 718/100 |
| 2013/0086355 A1* | 4/2013 | Narang et al. .................. | 712/30 |
| 2013/0103787 A1* | 4/2013 | Glover et al. ................ | 709/217 |
| 2013/0104140 A1* | 4/2013 | Meng et al. .................. | 718/104 |
| 2013/0204948 A1* | 8/2013 | Zeyliger ............. | G06F 9/44505 709/206 |

OTHER PUBLICATIONS

Alan Murphy ("Global Distributed Service in the Cloud with F5 and VMware",FS Networks white paper, 2009).*

(Continued)

*Primary Examiner* — Omar Fernandez Rivas
*Assistant Examiner* — Iftekhar Khan
(74) *Attorney, Agent, or Firm* — Krishnendu Gupta; Joseph D'Angelo

(57) ABSTRACT

A method, system, and program product comprising determining a set of objects to be represented in a computer model, determining the relationships between the object to be represented in the computer model, and creating layered over and underlying relationship between the determined set of objects.

15 Claims, 12 Drawing Sheets

(56) References Cited

OTHER PUBLICATIONS

Shvachko et al. ("The Hadoop Distributed File System", IEEE 2010, pp. 1-10).*

Yuan Luo, Zhenhua Guo, Yiming Sun, Beth Plale, Judy Qiu, Wilfred W. Li; A Hierarchical Framework for Cross-Domain MapReduce Execution; School of Informatics and Computing, Indiana University, Bloomington, IN, 47405; San Diego Supercomputer Center, University of California, San Diego, La Joila, CA. 92093.

* cited by examiner

US 9,489,233 B1

PARALLEL MODELING AND EXECUTION FRAMEWORK FOR DISTRIBUTED COMPUTATION AND FILE SYSTEM ACCESS

RELATED APPLICATIONS AND PRIORITY CLAIM

This Application is a Continuation-in-Part of U.S. patent application Ser. No. 13/435,009 entitled "BIOINFORMATICS CLOUDS AND BIG DATA ARCHITECTURE" filed on Mar. 30, 2012, the contents and teachings of which are incorporated herein by reference in their entirety, which application claims the benefit of U.S. Provisional Patent Application Ser. No. 61/578,757 entitled "BIOINFORMATICS CLOUDS AND BIG DATA ARCHITECTURE" filed on Dec. 21, 2011, the contents and teachings of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This Application is related to U.S. patent application Ser. No. 13/535,684 entitled "WORLDWIDE DISTRIBUTED FILE SYSTEM MODEL", Ser. No. 13/535,696 entitled "WORLDWIDE DISTRIBUTED ARCHITECTURE MODEL AND MANAGEMENT", Ser. No. 13/535,712 entitled "EXECUTION FRAMEWORK FOR A DISTRIBUTED FILE SYSTEM", Ser. No. 13/535,814 entitled "WORLDWIDE DISTRIBUTED JOB AND TASKS COMPUTATIONAL MODEL", Ser. No. 13/535,744 entitled "ADDRESSING MECHANISM FOR DATA AT WORLD WIDE SCALE", Ser. No. 13/535,760 entitled "SCALABLE METHOD FOR OPTIMIZING INFORMATION PATHWAY", Ser. No. 13/535,796 entitled "CO-LOCATED CLOUDS, VERTICALLY INTEGRATED CLOUDS, AND FEDERATED CLOUDS", and Ser. No. 13/535,821 entitled "DISTRIBUTED PLATFORM AS A SERVICE", filed on even date herewith, the contents and teachings of which are incorporated herein by reference in their entirety.

TECHNICAL FIELD

This invention relates to Big Data.

BACKGROUND

The amount of data in our world has been exploding. Companies capture trillions of bytes of information about their customers, suppliers, and operations, and millions of networked sensors are being embedded in the physical world in devices such as mobile phones and automobiles, sensing, creating, and communicating data. Multimedia and individuals with smartphones and on social network sites will continue to fuel exponential growth. Yet, the impact this growing amount of data will have is unclear.

SUMMARY

A method, system, and program product comprising determining a set of objects to be represented in a computer model, determining the relationships between the object to be represented in the computer model, and creating layered over and underlying relationship between the determined set of objects.

DESCRIPTION OF DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
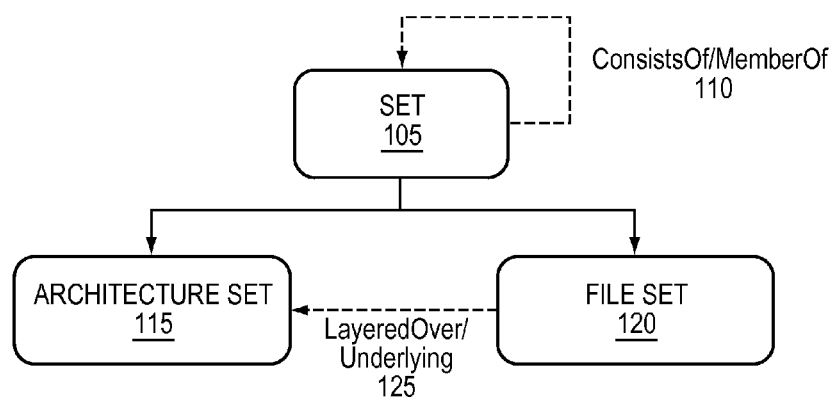
FIG. 1 is a simplified illustration of a represents a set and architecture set in a model for Big Data Architecture, in accordance with an embodiment of the present disclosure.

In some embodiments, this disclosure may enable the combination of a World Wide Shared Nothing Massive Parallel Processing (MPP) Execution Framework with a World Wide Distributed File System to locate and manage the data. Generally, in Massive Parallel Processing it may not be possible to locate the data and bring the execution code closer to where the data is, while minimizing information movement. In certain embodiments, the disclosure may enable combination of a World Wide MPP with a World Wide Distributed File System. In certain embodiments, users may be hidden from all the underlying complexity associated with finding and managing the data at a World Wide Scale. In other embodiments, the disclosure enables World Wide Shared Nothing, Massive Parallel Processing architectural components and computational activities. In an embodiment, the current disclosure enables the abstractions of a World Wide Job, World Wide Task, World Wide Job Tracker, and a World Wide Task Tracker. In alternative embodiments, the current disclosure may enable a World Wide Distributed File System, which may include the abstraction of a Domain, the computational activities of a World Wide Name Node and a World Wide Data Node, and the World Wide Distributed File System operations. In at least some embodiment, the current disclose may define an execution flow for World Wide Massive Parallel Processing activities that are executed against a Domain managed by a World Wide Distributed File System. In some embodiments, the current disclosure may extend the abstractions. In certain embodiments, this disclosure may connect and interleave the execution frameworks.

Generally, the amount of data capture has grown in every area of global economy. Normally, companies are churning out increasing amounts of transactional data, capturing trillions of bytes of information about their customers, suppliers, and operations. Conventionally, millions of networked sensors embedded in the physical world in devices such as mobile phones, smart energy meters, automobiles, and industrial machines create data that is recorded and stored (computed, archived, analyzed . . . ). Usually, as companies and organizations generate a tremendous amount of digital data that are created as a by-product of their activities. Often, enterprises may be collecting data with greater granularity and frequency, capturing every customer transaction, attaching more personal information, and also collecting more information about consumer behavior in many different environments. Usually, this activity increases the need for more storage and analytical capacity.

Typically, social media sites, smartphones, and other consumer devices including PCs and laptops have allowed billions of individuals around the world to contribute to the amount of data available. Normally, consumers communicate, browse, buy, share, and search creating large amounts of consumer data. However, conventional techniques are not able to monitor or analyze this "Big Data." Generally, conventional modeling techniques do not accommodate for or do not model the properties that define Big Data. For example, conventional techniques may not be able to perform analysis on Big Data because of the sheer number and size of transaction that would be necessary to perform the analysis. As well, conventional techniques may consider elements as attributes of the data when, to properly represent the Big Data these "attributes" may need to be considered as properties of the Big Data.

In some embodiments, "Big Data" may refer to a dataset that has a size, volume, analytical requirements, or structure demands larger than typical software tools may capture, store, manage, and analyze. In certain embodiments, "Big Data" may refer to a dataset that has a combination of attributes, such as size, volume, structure, or analytical requirements, with which typical software tools may not be able to work. In most embodiments, big data is not defined in terms of being larger than a certain number of terabytes rather, as technology advances over time, the size of datasets that qualify as big data may also increase. In certain embodiments, data transfer speed and no of transactions may also attributes of Big Data.

In further embodiments, the definition of "Big Data" may vary by sector or industry, depending on what kinds of software tools are commonly available and what sizes of datasets are common in a particular industry. Big Data may refer to data from Digital Pathology, data from seismological surveys, data from the financial industry, and other types of data sets that are generally too large, for example in size or number of transactions, to be modeled an analyzed with conventional techniques.

Typically, organizations and business units share IT services, which may result in the creation of Big Data. Generally, the network, apps, and servers are shared and/or dedicated in many instances. Usually, of cloud and Big Data models and analytic platforms provide opportunities for the storage business. However, conventional file sizes vary depending on the verticals, domains and type of data. Conventionally solutions provide a good infrastructure to host files that are large in size, but not for smaller files.

For example, a conventional cluster type architecture for big data assumes a flat commodity world, where processing cores and disk drives are cheap and abundant, even though they may and will fail often, applications are computing and data intensive, where computations may need to be done over the entire data set; and in processing Big Data, transfer time becomes the new bottleneck. Traditionally, a Cluster architecture may be based on a set of very simple components and assumes that there are hundreds or thousands of these components together, a node may have a set of processing cores attached to a set of disks, a rack may have a stack of nodes, and a cluster may have a group of racks. Conventionally, within the context of a Cluster, Big Data is typically divided into equal size blocks and the blocks are distributed across the disks in the nodes. Usually, the data in each node may processed by the processing cores in the node providing Data Locality where the data is collocated with the computing node.

Typically, distributed file systems may provide data in a data center to be split between nodes. Generally, a distributed file system may split, scatter, replicate and manage data across the nodes in a data center. Typically, a file system may be a distributed file system when it manages the storage across a network of machines and the files are distributed across several nodes, in the same or different racks or clusters. Conventionally, map reduce may be a computational mechanism to orchestrate the computation by dividing tasks, collecting and re-distributing intermediate results, and managing failures across all nodes in the data center. In certain embodiments, the current techniques may enable data to be split between nodes. In other embodiments, the current techniques may enable computation on data that has been split between nodes.

Conventionally, a distributed file system may a set of equal size blocks. Typically these blocks may be multiples of a simple multiplier, such as 512 kb. Generally, file blocks may be the unit used to distribute parts of a file across disks in nodes. Usually, as disks in a node and nodes in a rack may fail, the same file block may be stored on multiple nodes across the cluster. Typically, the number of copies may be configured. Usually, the Name Node may decide in which disk each one of the copies of each one of the File Blocks may reside and may keep track of all that information in local tables in its local disks. Conventionally, when a node fails, the Name Node may identify the file blocks that have been affected; may retrieve copies of these file blocks from other healthy nodes; may find new nodes to store another copy of them, may store these other copies; and may update this information in its tables. Typically, when an application needs to read a file, may connects to the Name Node to get the addresses for the disk blocks where the file blocks are and the application may then read these blocks directly without going through the Name Node anymore.

Generally, Big Data is Multi Structured and may be conventionally stored, analyzed and managed each type of information in a number of different ways. In some embodiments, structured data may be stored in Block based, SQL, and RDBMS type databases. In other embodiments, semi-structured data may be stored in XML Data Files, in File Based systems, and in Hadoop Map Reduce. In further embodiments, quasi-structured data may be data containing some inconsistencies in data values and formats, e.g., Web click-stream data. In some embodiments, unstructured data may be text documents that could be subject to analytics over text or numbers such as file based data, Hadoop MapReduce, and HDFS data. In other embodiments, unstructured data may be images and video such as file based data, and data streamlined with technologies such as MapReduce, or Scale Out NAS data. Typically, it may be difficult to process information stored in all different formats, cross-analyze content, or visualize and gain insight into the important information spread all over the different formats.

As used herein, for simplicity, a framework for Massive Parallel Processing (MPP) within the delimiters of a Cluster or data set may be referred to as Hadoop by way of example, however any framework may be used and the current techniques are not limited to use with Hadoop. Generally, the Hadoop framework focuses on Massive Parallel Processing (MPP) within the delimiters of a Cluster or data set. Often, Hadoop may be utilized in an attempt to analyze Big Data.

Usually, Hadoop assumes that data or Big Data has been transferred to a single cluster and has been evenly distributed across the nodes of the cluster. Typically, Hadoop does not enable analysis of data across multiple clusters. Conventionally, different parts of the Big Data may reside on different clusters potentially spread across different clouds. Usually, a retail enterprise may need to analyze its sales transactions over the last 5 years, but it may store last four years' transactions in a Public Cloud while retaining the last 12 months in its own Private Cloud. Generally, the enterprise does not have the storage, processing capacity or bandwidth, to repatriate the last four years worth of Big Data to its private cloud. In an embodiment, the current disclosure enables management of big data sets where the content may exist across numerous clouds or data storage centers. Generally, with respect to the data, there may be two architectural frameworks. Conventional architecture design may assume that there are three main types of hardware resources to be managed, servers, enclosing very expensive processors that should not be idle at any moment in time, storage Arrays, enclosing drives of different performance and capacity ranging from Solid State Drive (SSD) to Fiber Channel and SATA, and Storage Area Network (SAN), connecting a set of servers to a set of storage arrays. Generally, this architecture may assumes that most applications are "computing intensive" meaning that there will be high demand for processing power that performs computation on a subset of all the data available for the application, which may be transferred across the SAN to the servers.

In some embodiments, World Wide Hadoop (WWH) or other big data processing methodologies may enable Massive Parallel Processing (MPP) to be executed across multiple clusters, and clouds without requiring one or more Big Data sets to be located at the same location. In certain embodiments, WWH may have a layer of orchestration on top of Hadoop or a similar architecture that manages the flow of operations across clusters of nodes. In other embodiments, the clusters maybe separate across metro or worldwide distances. In further embodiments, the current techniques may enable World Wide Hadoop (WWH) to enable Genome Wide Analysis (GWA) of Genomes that reside on different Genome Banks, one located in NY and another located in MA.

In certain embodiments, World Wide Hadoop may be applied where big data clouds exist. In certain embodiments, clouds may be extension of the other clouds. In other embodiments, clouds may be an independent cloud. In further embodiments, clouds may be providing an analysis services to other clouds. In some embodiments, the big data clouds may exchange raw data or analyze data for further processing. In certain embodiments, the domain expertise, open data, open science data, analysis etc, may come from different geographic locations and different clouds may host the respective big data. In at least some embodiments, the federation among big data clouds may present an internet infrastructure challenge.

In some embodiments, factors like cost and bandwidth limit may affect the big data Hadoop deployment federation. In certain embodiments, the current techniques may model Hadoop environments. In other embodiments, the current techniques may re-define roles of the Hadoop components in the Hadoop clusters. In certain embodiments, Massive Parallel Processing may be enabled across clouds. In some embodiments, WWH concepts apply where there are many big data clouds, and the clouds may need to either exchange raw data or analyze data for further processing. In some embodiments, as used herein, a cluster may be used interchangeably with a data center.

The following list of acronyms may be useful in understanding the terms use here in:

WW—World Wide
WWH—World Wide Hadoop
DNN—Distributed Name Node
DDN—Distributed Data Node
MPP—Massively Parallel Processing
SSD—Solid State Drive
GWA—Genome Wide Analysis
FS—File System
WWDFS—World Wide Distributed File System
DFS—Distributed File System
HDFS—Hadoop Distributed File System
WWHDFS—World Wide Hadoop Distributed File System
WWF—World Wide File
WWN—World Wide Name
WWFN—World Wide File Name
WWS—World Wide Scale
WWJT—World Wide Job Tracker
WWTT—World Wide Task Tracker
WWA—World Wide Addressing
WWD—World Wide Data Data Model In most embodiments a data model or modeling structure may be used to process data across clusters. In most embodiments, the data model may enable representation of multiple data sets. In certain embodiments, this model may include data notes, data clusters, data centers, clouds, and skies.

In most embodiments, the classes, objects, and representations referenced herein may be an extension of known distributed system models, such as the EMC/Smarts Common Information Model (ICIM), or similarly defined or pre-existing CIM-based model and adapted for the environmental distributed system, as will be discussed. EMC and SMARTS are trademarks of EMC Corporation, Inc., having a principle place of business in Hopkinton, Ma, USA. This exemplary model is an extension of the DMTF/SMI model. Model based system representation is discussed in commonly-owned U.S. patent application Ser. No. 11/263,689, filed Nov. 1, 2005, and Ser. No. 11/034,192, filed Jan. 12, 2005 and U.S. Pat. Nos. 5,528,516; 5,661,668; 6,249,755 and 6,868,367, and 7,003,433, the contents of all of which are hereby incorporated by reference. An example of a Big Data Set may be found in commonly-owned U.S. patent application Ser. No. 12/977,680, filed Dec. 23, 2010, entitled "INFORMATION AWARE DIFFERENTIAL STRIPING" the contents of which are hereby incorporated by reference. An example of modeling Big Data Set may be found in commonly-owned U.S. patent application Ser. No. 13/249,330, filed Sep. 30, 2011, and entitled "MODELING BIG DATA" the contents of which are hereby incorporated by reference. An example of analyzing Big Data Set may be found in commonly-owned U.S. patent application Ser. No. 13/249,335, filed Sep. 30, 2011, and entitled "ANALYZING BIG DATA" the contents of which are hereby incorporated by reference.

Generally, referred-to US Patents and patent applications disclose modeling of distributed systems by defining a plurality of network configuration non-specific representations of types of components (elements or devices) managed in a network and a plurality of network configuration non-specific representations of relations among the types of managed components and problems and symptoms associated with the components and the relationships. The configuration non-specific representations of components and relationships may be correlated with a specific Big Data set for which the associated managed component problems may propagate through the analyzed system and the symptoms associated with the data set may be detected an analyzed. An analysis of the symptoms detected may be performed to determine the root cause—i.e., the source of the problem—of the observed symptoms. Other analysis, such as impact, fault detection, fault monitoring, performance, congestion, connectivity, interface failure, in addition to root-cause analysis, may similarly be performed based on the model principles described herein.

Modeling and Execution Framework

In some embodiments, the current disclosure may enable the modeling of the connecting relationships between World Wide Shared Nothing, Massive Parallel Processing architectural components and computational activities, including the abstractions of a World Wide Job, World Wide Task, World Wide Job Tracker, and a World Wide Task Tracker. In certain embodiments, the current disclosure may enable a World Wide Distributed File System, including the abstraction of a Domain, the computational activities of a World Wide Name Node and a World Wide Data Node, and the World Wide Distributed File System operations.

In an embodiment, the current disclosure may define an execution flow for World Wide Massive Parallel Processing activities that are executed against a Domain managed by a World Wide Distributed File System. In some embodiments, the current disclosure may use and extend abstractions defined in co-owned application Ser. No. 13/435,009.

In certain embodiments, may leverage a set. In some embodiments, a set may be an abstract class representing entities that may have the same properties of the mathematical construct set. In at least one embodiment, members of the set class may have a ConsistsOf relationship with other members of the set class. In an embodiment, the inverse relationship for ConsistsOf may be MemberOf.

Refer now to the example embodiment of FIG. 1. Set 105 may consist of itself, set 103. Architecture set 115 may be derived from Set 105. File set 12 may be derived from set 105. File set 120 may be layered over r underlying 125 Architecture set 115.

Figure 2:
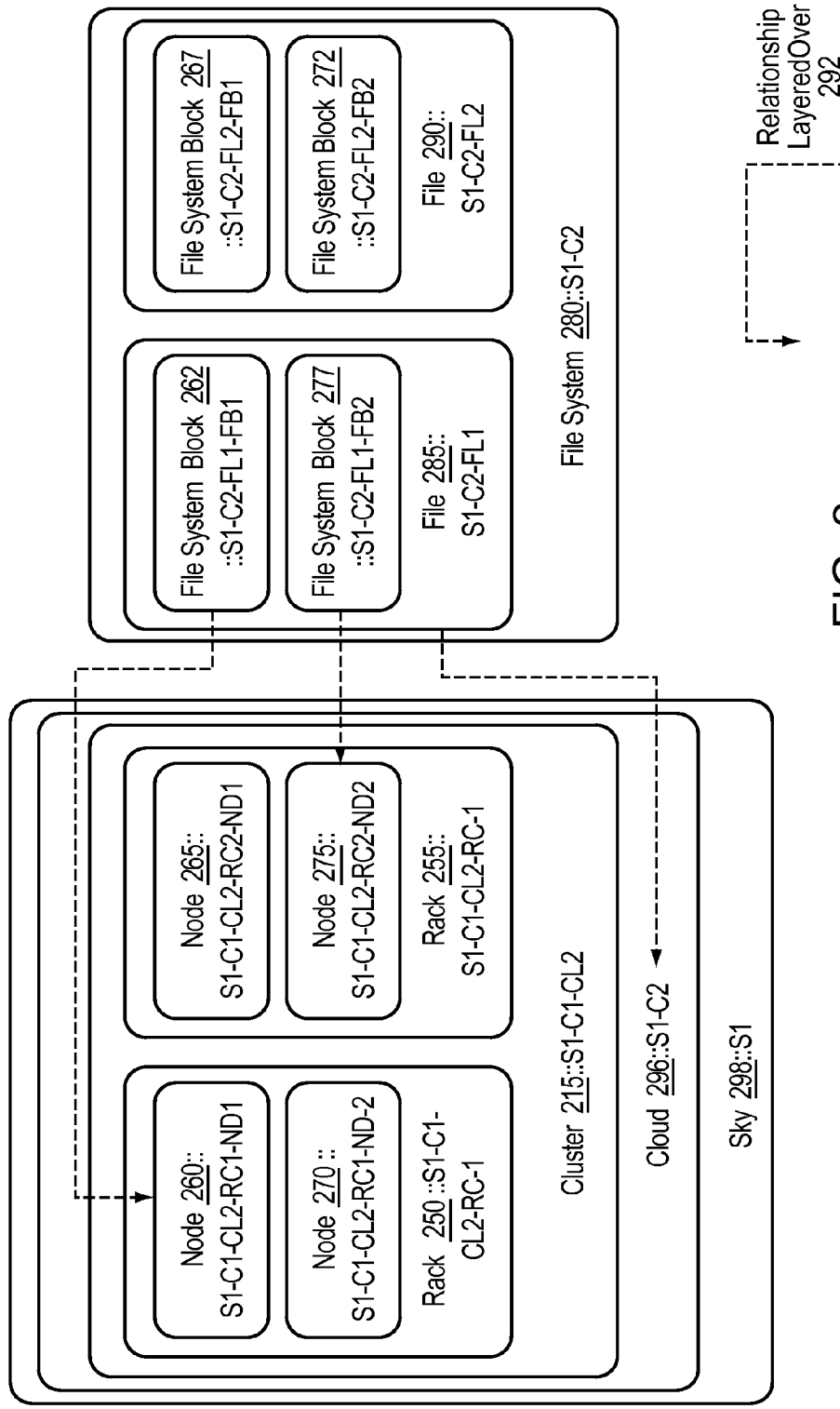
FIG. 2 is a further simplified illustration of a model representation of infrastructure components information including a sky, cloud, cluster, and file system, in accordance with an embodiment of the present disclosure.

Refer now to the example embodiment of FIG. 2. In the example embodiment of FIG. 2, there is sky 298 which contains cloud 296, which contains cluster 215. Cluster 215 contains racks 250 and rack 255. Rack 250 contains nodes 270 and 260. Rack 255 contains node 275 and 265. File system 280 contains files 285 and 290. File system 286 contains file system block 277 and 262. File 290 contains file system block 272 and file system block 267. File 285 is layered over cloud 296. File block 277 is layered over node 275. File system block 262 is layered over node 260.

In most embodiments, the relationship Layered/Over may be applied at many different levels of abstraction/granularity, and may represent different levels of interdependency. In some embodiments, the File Block may be LayeredOver a Node, which may represent that the File Block resides on the Disks in that Node. In certain embodiments, the relationship LayeredOver may not represent the Disks in the Node where the File Blocks reside. In other embodiments, the layeredover may not represent the Storage Blocks in which the File Blocks are stored. In some embodiments, the File may be LayeredOver a Cluster, which may represent that the File Data is stored in nodes of the cluster. In an embodiment, a File System may be LayeredOver a Cluster, which may represent that the File System resides on the Cluster.

Figure 3A:
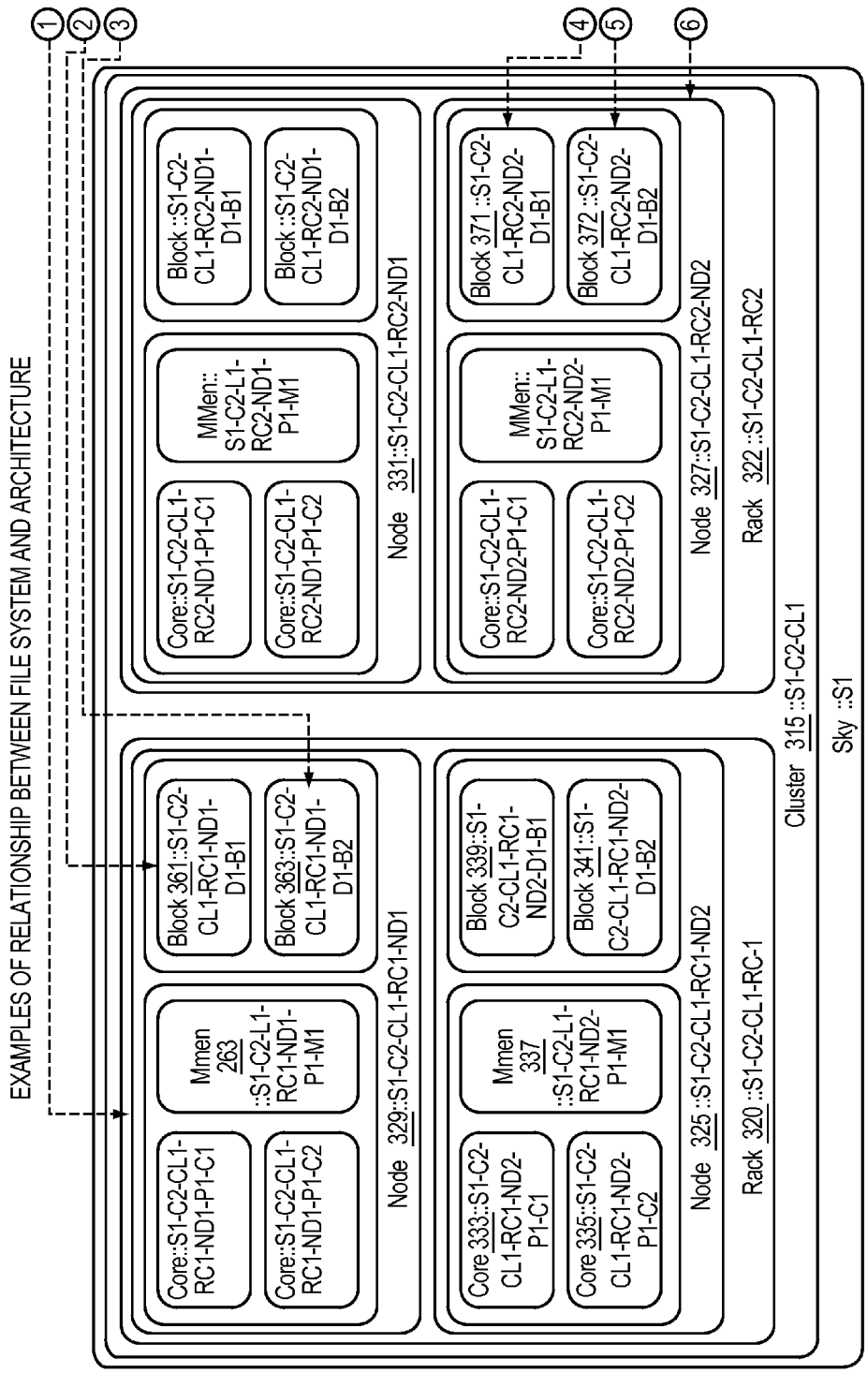
FIGS. 3a and 3b are a simplified illustration representing a sky with a cluster, which contain racks, which contains nodes, outlining the relationship between a file system and an architecture, in accordance with an embodiment of the present disclosure.
Figure 3B:
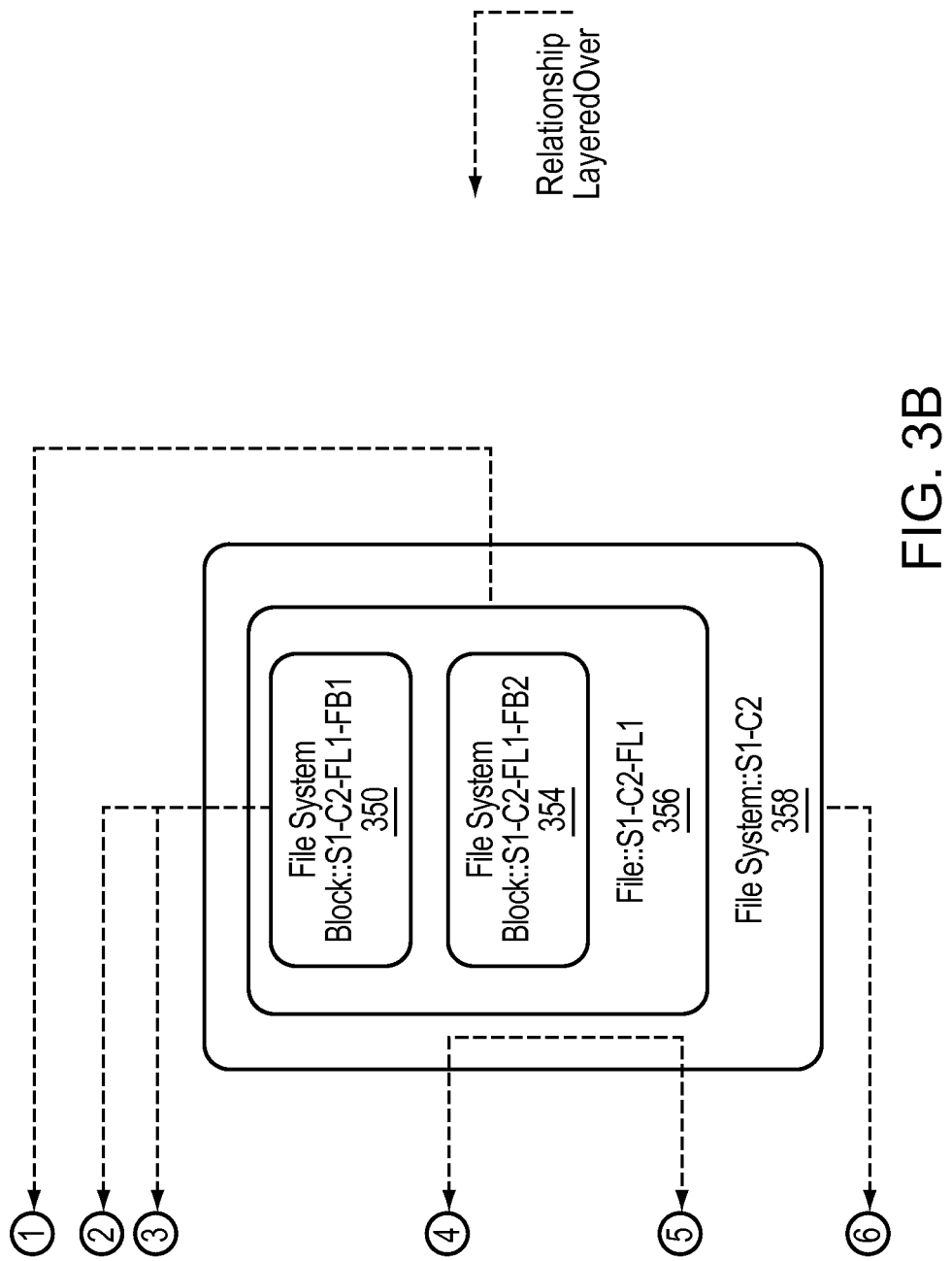

Refer now to the example embodiments of FIGS. 3a and 3b. In the example embodiment of FIG. 3, sky 360 has cluster 315. Cluster 315 has rack 320 and 322. Rack 320 has node 325 and node 329. Nodes 325 and 329 have cores, mmem and blocks, such as blocks 339 and 341, mmem 337, core 333 and core 335. File system 358 has file 356. File 356 has file system block 354 and file system block 350. File system block 350 is layered over blocks 361 and 363. File 356 is layered over node 329. File system 358 is layered over node 337. File system block 354 is layered over blocks 371 and 372. In the example embodiment of FIGS. 3a and 3b, a relationship LayeredOver is used to represent the relationship between a File Block and the individual Storage (Disk) Block and a File Block and the individual Nodes containing the disks where the data in the file block is stored.

In other embodiments, a file block may actually occupy several Disk Blocks. In further embodiments, different levels of granularity may enable inference of relationships at higher level of granularity. In an embodiments, a LayeredOver relationship between a File Block FB (of a File F) and a Disk Block DB on a Storage S on a Node N may lead to the inference of relationship Layered Over between F and N, FB and N, F and S, FB and S.

Figure 4:
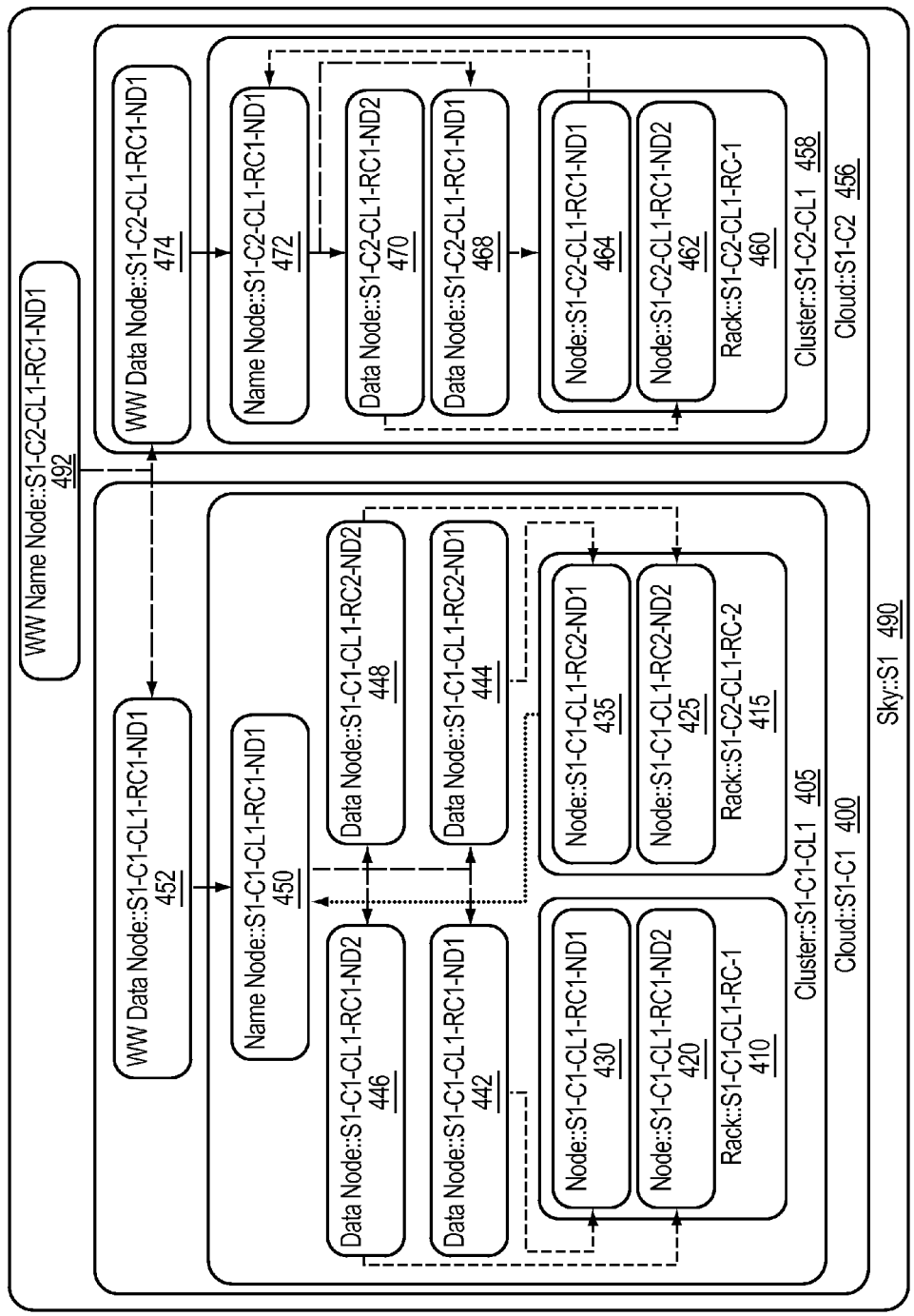
FIG. 4 is a simplified illustration representing a sky with a cluster, which contain racks, which contains nodes, outlining the relationship between a cloud and WW entities, in accordance with an embodiment of the present disclosure.

Refer now to the example embodiment of FIG. 4, which illustrates example relationships between cloud and WW entities. A sky has cloud 400, cloud 456, and WW Name node 492. Cloud 400 has cluster 405 and WW Data Node 453. Cloud 456 has cluster 458 and WW Data Node 474. Cluster 405 has rack 410, rack 415, name node 450, and data nodes 442, 444, 445, and 448. Rack 410 has nodes 420 and 430. Rack 425 has nodes 425 and 435. Cluster 458 has rack 460 data node 468, data node 40, and name node 472. Rack 460 has nodes 462 and 464. WW name node 492 tracks WW data nodes 474 and 452. Data nodes 446, 442, 444, and 448 are tracked by name node 450. Name node 450 is tracked by WW Data node 452. Name node 472 tracks data nodes 468 and 470. WW data node 474 tracks name node 472. Data node 442 is assumed by node 430. Data node 446 is assumed by node 420. Data node 448 is assumed by node 425. Node 435 is assumed by data node 444. Data node 462 is assumed by data node 470. Name node 472 assumes node 464. Name node 450 is tracked by node 435.

Figure 5:
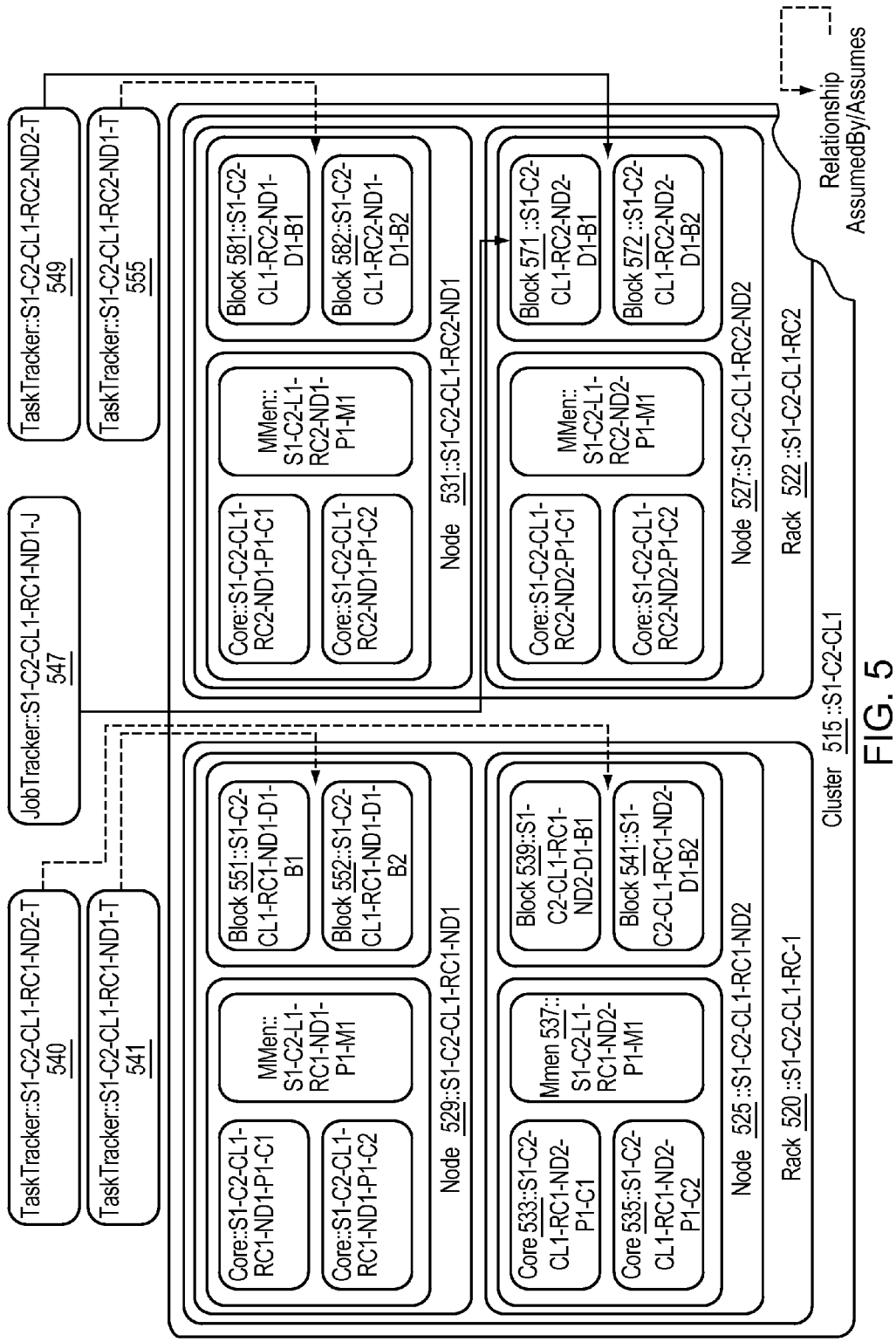
FIG. 5 is a simplified illustration representing a cluster, which contain racks, which contains nodes, task trackers, and a job tracker, in accordance with an embodiment of the present disclosure.

Refer now to the example embodiment of FIG. 5. In the example embodiment of FIG. 5, there are cluster 515, task tracker 540, task tracker 541, job tracker 547, task tracker 549, and task tracker 555. Cluster 515 has rack 522 and rack 520. Rack 520 has nodes 525 and 529. Node 525 has core 533, core 535, mmem 537, block 539, and block 341. Node 529 has blocks 561 and 563. Rack 522 has nodes 527 and 531. Node 527 has blocks 571 and 572. Task tracker 541 is layered over blocks 551 and 552. Task tracker 540 is layered over blocks 539 and 541. Task tracker 555 is layered over blocks 581 and 582. Task tracker 549 is layered over blocks 571 and 572. Job tracker 547 is layered over node 527. Tracking In certain embodiments, there may be job trackers and task trackers that may be distributed across Hadoop clusters in a world wide Hadoop implementation. In certain embodiments, the job and task trackers may track the execution of one or more task executed across one or more of the Hadoop clusters. In some embodiments, the distribution of a set of Hadoop clusters may be discovered and job and task trackers may be associated with the set of Hadoop clusters.

Figure 6:
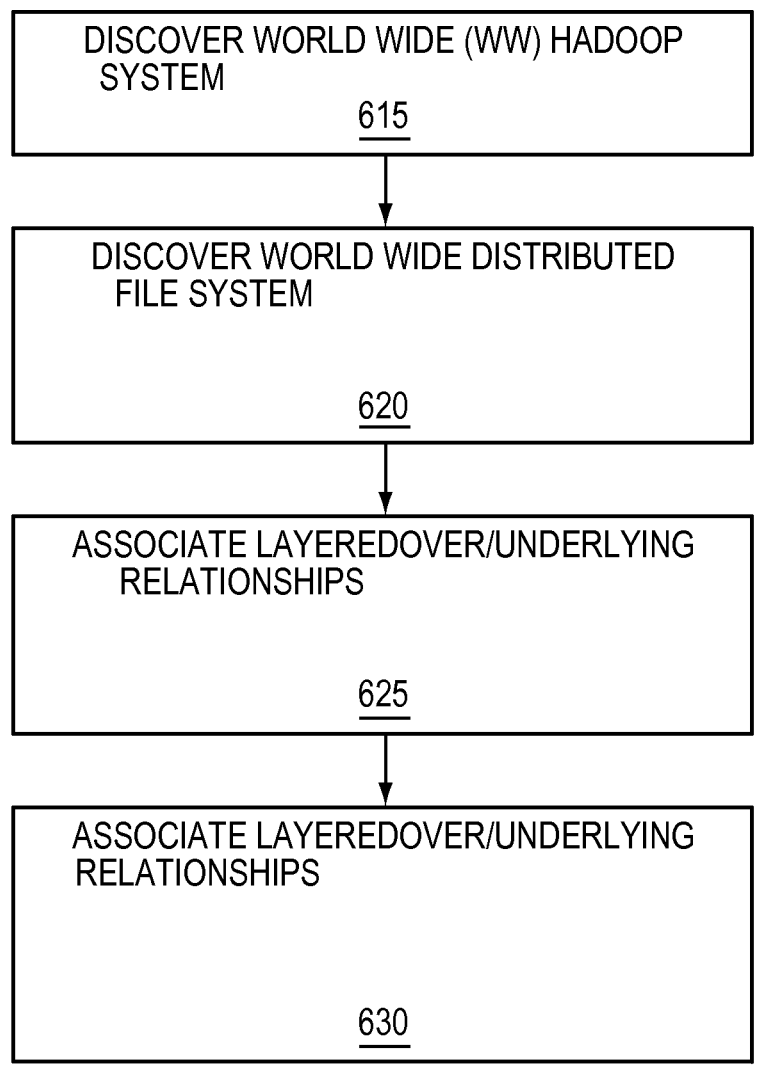
FIG. 6 is a simplified method for discovering a WW file system, in accordance with an embodiment of the present disclosure.
Figure 7:
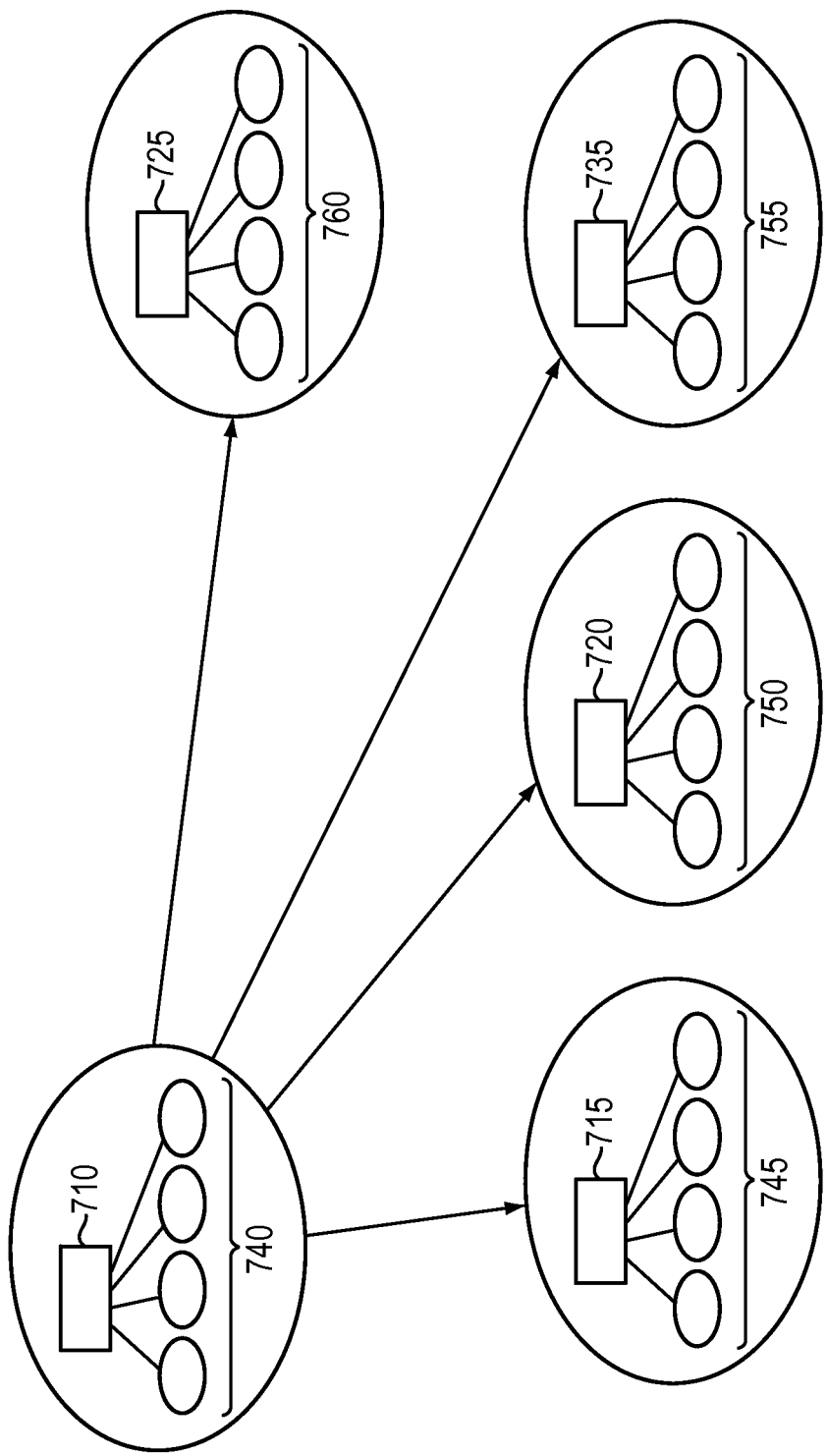
FIG. 7 is a simplified illustration representing a World Wide File system comprising a plurality of domains or clusters, in accordance with an embodiment of the present disclosure.

Refer now to the example embodiments of FIGS. 6 and 7. The world wide hadoop system of FIG. 7, where 710, 715, 720, 725, and 735 are hadoop clusters, may be discovered by a World Wide Job Tracker (step 615). The World Wide Distributed File System and Architectural components such as name and data nodes may be discovered (step 620). Layered over/underlying relationships between the worldwide hadoop system and the world wide job and task trackers may be created (step 625). Layeredover/underlying relationships may be associated between the world wide distributed file system and architectural components such as name and data nodes (step 630).

Figure 8:
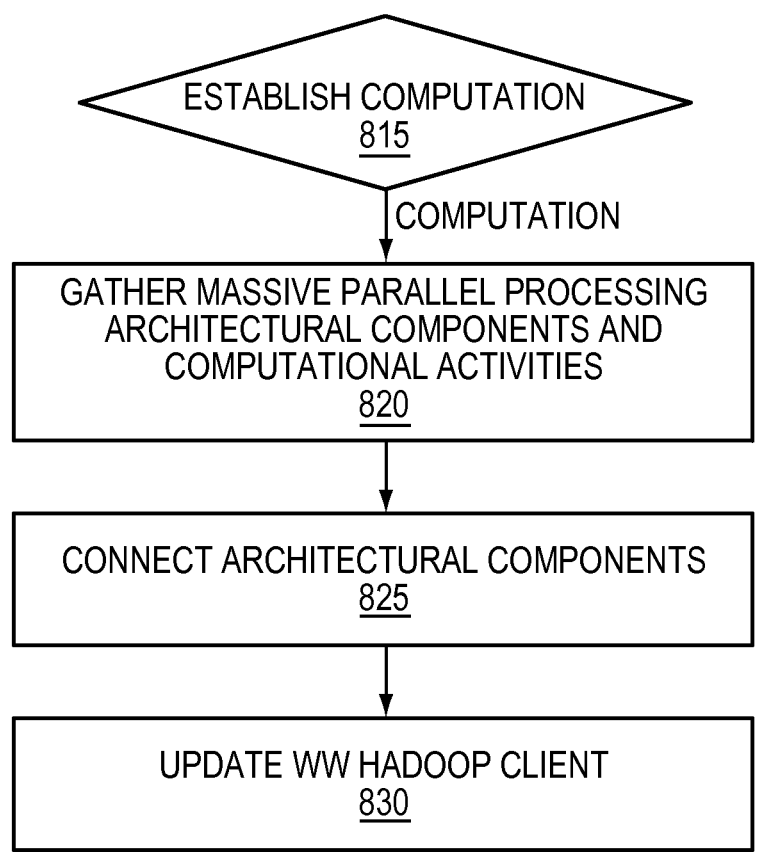
FIG. 8 is a simplified method for connecting architectural components in a WW file system, in accordance with an embodiment of the present disclosure.

Refer now to the example embodiment of FIG. 8. For the WW clients and local domains in a WW hadoop system a computation is established (step 815). The massive parallel processing architectural components are gathered (step 820). In some embodiments, this may include abstractions of a worldwide job, worldwide task, worldwide job tracker, and worldwide task tracker. The architectural components, such as nodes and clusters, may be connected using layered over and underlying relationships (step 825). The WW hadoop client may be updated and the computational topology may be updated (step 830).

Figure 9:
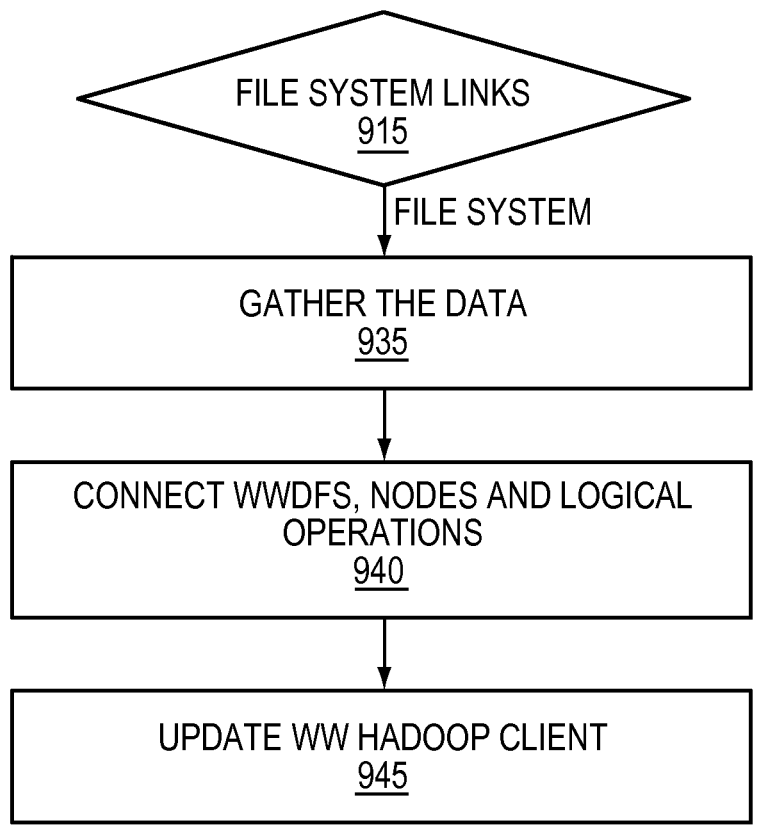
FIG. 9 is a simplified method for connecting operations a WW file system, in accordance with an embodiment of the present disclosure.

Refer now to the example embodiment of FIG. 9. The file system links are determined (step 915). The data on the Worldwide distributed file system is gathered (step 935). In some embodiments this may include the abstraction of a domain, the computational activities of a worldwide name node, a worldwide data note, and the worldwide distributed file system operations. The WWDFS, nodes, and logical operations may be connected using layeredover and underlying relationships (step 940). The WW hadoop client may be updated and the file system topology may be verified (step 945).

Figure 10:
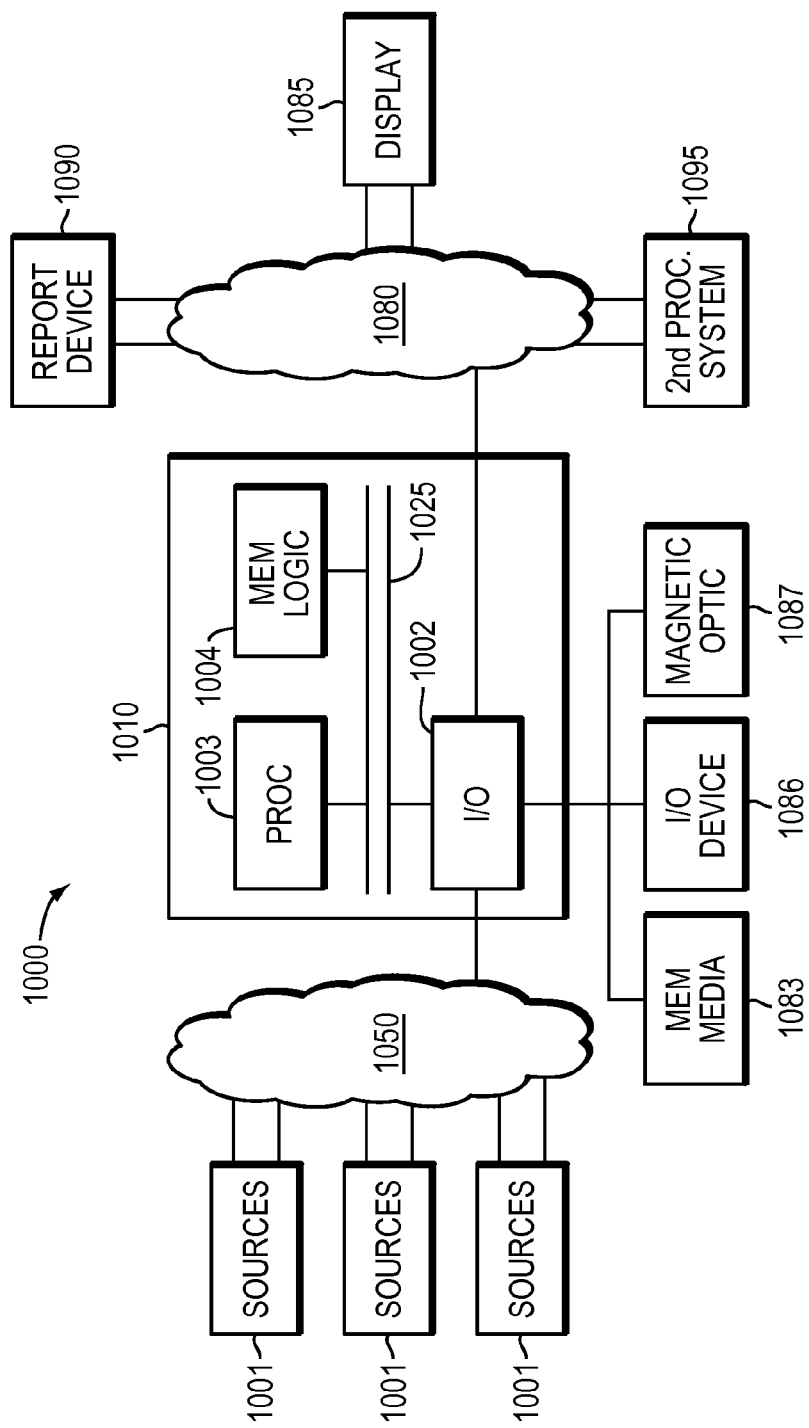
FIG. 10 is an example of an embodiment of an apparatus that may utilize the techniques described herein, in accordance with an embodiment of the present disclosure.
Figure 11:
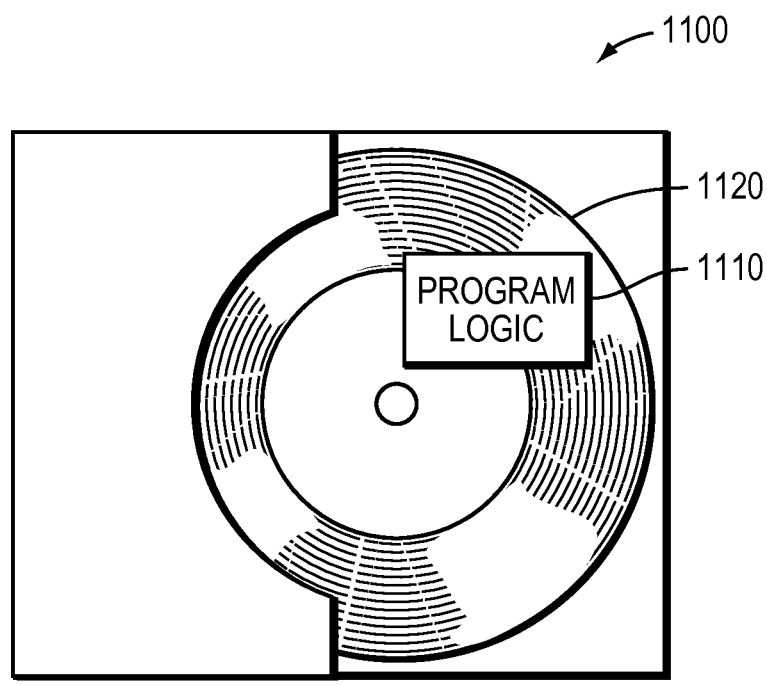
FIG. 11 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor 1003 to provide a unique apparatus that operates analogously to specific logic circuits. As such a general purpose digital machine can be transformed into a special purpose digital machine. FIG. 11 shows Program Logic 1134 embodied on a computer-readable medium 1130 as shown, and wherein the Logic is encoded in computer-executable code configured for carrying out the reservation service process of this invention and thereby forming a Computer Program Product 1100. The logic 1034 may be the same logic 1040 on memory 1004 loaded on processor 1003. The program logic may also be embodied in software modules, as modules, or as hardware modules.

The logic for carrying out the method may be embodied as part of the system described below, which is useful for carrying out a method described with reference to embodiments shown in, for example, FIG. 7 and FIG. 8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. An apparatus comprising:

One or more processors and a memory coupled with the one or more processors, comprising:
   a determining module to determine a set of objects to be represented in a computer model; wherein a first subset of the objects of the set represents storage capabilities; wherein a second subset of the objects of the set represents processing capabilities;
   a determine module to determine the relationships between the objects to be represented in the computer model;
   a grouping module to group the set of objects into groups; wherein each group of the groups of objects is enabled to perform parallel processing;
   a representing module to represent the groups in the computer model;
   a creation module to create layered over and underlying relationship between respective objects of the determined set of objects as representations in the computer model; wherein the objects of each respective group enabled to perform parallel processing have a distributed file system mapping out the objects of each group; wherein the distributed each group is enabled to use resources corresponding to the objects of the group to perform parallel processing;

a connecting module to connect the groups to enable parallel processing across the groups by enabling the groups enabled to perform parallel processing to communicate with each other using the computer model; wherein a worldwide distributed file system is represented by the computer model mapped over the distributed file system of each respective group of parallel processing.

2. The apparatus of claim 1 further comprising:
a grouping module to group the set of objects into groups of parallel processing; and
a connecting module to connect the set of objects components to enable parallel processing across groups of parallel processing by enabling the groups of parallel processing to communicate with each other; and
a performance module to perform analysis across the connected parallel processing groups using the worldwide distributed file system.

3. The apparatus of claim 2 further comprising:
gathering the analysis performed using each of the connected parallel processing groups; and
a connection module to connect the gathered analysis to enable analysis based on the analysis of the parallel processing groups.

4. The apparatus of claim 3 further comprising:
a gathering module to gather data from task monitoring systems; wherein the task monitoring systems are located across the groups enabled to perform parallel processing.

5. The apparatus of claim 4 further comprising:
a file system module to determine the worldwide distributed file system to span across groups enabled to perform parallel processing; and
an implementation module to implement the file system to enable data access and task execution across the groups enabled to perform parallel processing.

6. A computer program product comprising:
a non-transitory computer readable medium encoded with computer executable program code, the code configured to enable the execution of:
determining a set of objects to be represented in a computer model; wherein a first subset of the objects of the set represents storage capabilities; wherein a second subset of the objects of the set represents processing capabilities;
grouping the set of objects into groups; wherein each group of the groups of objects is enabled to perform parallel processing;
representing the groups in the computer model;
determining relationships between the objects to be represented in the computer model;
creating layered over and underlying relationship between respective objects of the determined set of objects as representations in the computer model; wherein the objects of each respective group enabled to perform parallel processing have a distributed file system mapping out the objects of each respective group; wherein the distributed file system of each respective group of the groups is represented in the computer model; wherein each group is enabled to use resources corresponding to the objects of the group to perform parallel processing;
connecting the groups to enable parallel processing across the groups by enabling the groups enabled to perform parallel processing to communicate with each other using the computer model; wherein a worldwide distributed file system represented by the computer model is mapped over the distributed file system of each respective group of parallel processing.

7. The computer program product of claim 6 the code further configured to enable the execution of:
performing analysis across the connected parallel processing groups using the worldwide distributed file system.

8. The computer program product of claim 7 the code further configured to enable the execution of:
gathering the analysis performed using each of the connected parallel processing groups; and
connecting the gathered analysis to enable analysis based on the analysis of the parallel processing groups.

9. The computer program product of claim 8 the code further configured to enable the execution of:
gathering data from task monitoring systems; wherein the task monitoring systems are located across the groups enabled to perform parallel processing.

10. The computer program product of claim 9 the code further configured to enable the execution of:
determining the worldwide distributed file system to span across groups enabled to perform parallel processing; and
implementing the file system to enable data access and task execution across the groups enabled to perform parallel processing.

11. A computer implemented method comprising:
determining a set of objects to be represented in a computer model; wherein a first subset of the objects of the set represents storage capabilities; wherein a second subset of the objects of the set represents processing capabilities;
grouping the set of objects into groups; wherein each group of the groups of objects is enabled to perform parallel processing;
representing the groups in the computer model;
determining relationships between the objects to be represented in the computer model;
creating layered over and underlying relationship between respective objects of the determined set of objects as representations in the computer model; wherein the objects of each respective group enabled to perform parallel processing have a distributed file system mapping out the objects of each respective group; wherein the distributed file system of each respective group of the groups is represented in the computer model; wherein each group is enabled to use resources corresponding to the objects of the group to perform parallel processing;
connecting the groups to enable parallel processing across the groups by enabling the groups enabled to perform parallel processing to communicate with each other using the computer model; wherein a worldwide distributed file system represented by the computer model is mapped over the distributed file system of each respective group of parallel processing.

12. The method of claim 11 further comprising:
performing analysis across the connected parallel processing groups.

13. The method of claim 12 further comprising:
gathering the analysis performed using each of the connected parallel processing groups; and
connecting the gathered analysis to enable analysis based on the analysis of the parallel processing groups.

14. The method of claim 13 further comprising:
gathering data from task monitoring systems; wherein the task monitoring systems are located across the groups enabled to perform parallel processing.

15. The method of claim 14 further comprising:
determining the worldwide distributed file system to span across groups of parallel processing; and
implementing the file system to enable data access and task execution across the groups enabled to perform parallel processing.

* * * * *